United States Patent [19]

Montgomery et al.

[11] Patent Number: 5,288,177
[45] Date of Patent: Feb. 22, 1994

[54] METHODS OF TREATING LOCAL SOILS TO MAKE THEM OLEOPHILLIC AND OF USING THE SOILS TO MINIMIZE, CONSOLIDATE, AND CLEAN UP OILY SPILLS

[76] Inventors: Richard H. Montgomery, 2752 W. North Union Lot #72, Midland, Mich. 48642; Ramon E. Bisque, 9113 Fernway, Golden, Colo. 80403; John W. Ryan, 514 Linwood Dr., Midland, Mich. 48640

[21] Appl. No.: 964,561

[22] Filed: Oct. 21, 1992

Related U.S. Application Data

[63] Continuation of Ser. No. 700,769, May 15, 1991, abandoned.

[51] Int. Cl.$^5$ ............................................. E02B 15/04
[52] U.S. Cl. ......................................... 405/264; 405/128; 106/287.1; 106/490; 210/749; 210/925
[58] Field of Search ............... 405/60, 74, 128, 129, 405/264, 258, 263; 210/749, 908, 921–925; 134/6, 7; 106/33, 287.1, 490; 423/340

[56] References Cited

U.S. PATENT DOCUMENTS

| | | | |
|---|---|---|---|
| 3,749,667 | 7/1973 | Lindstrom | 210/924 X |
| 3,843,306 | 10/1974 | Whittington et al. | 431/8 |
| 4,151,078 | 4/1979 | Calvin | 210/924 X |
| 4,481,113 | 11/1984 | Canevari | 210/924 X |
| 4,481,328 | 11/1984 | Harreus et al. | 524/493 |
| 4,563,483 | 1/1986 | Smith et al. | 210/924 X |
| 4,892,895 | 1/1990 | Arai et al. | 522/99 |
| 4,940,846 | 7/1990 | Hinterwaldner | 427/385.5 |
| 4,975,122 | 12/1990 | Parkinson et al. | 106/727 |
| 5,021,390 | 6/1991 | Hatton | 502/401 |
| 5,091,002 | 2/1992 | Schamberg et al. | 106/2 |

FOREIGN PATENT DOCUMENTS

2333564  7/1977  France ............................. 210/925

OTHER PUBLICATIONS

Letter to U.S. Geological Survey, Feb. 25, 1969 D. N. Stevens From Earth Sciences, Inc.
Article California Oil World, Los Angeles, Calif. Apr. 1969, "Claim Oil Slick may be kept frm beacher".
Article, Denver Post, Mar. 19, 1969, Lindberg "Sand may clean up oil".

*Primary Examiner*—Randolph A. Reese
*Assistant Examiner*—John Ricci

[57] ABSTRACT

Various silicone materials, which have a low order of toxicity to fish, birds, and wildlife; and which slowly degrade to carbon dioxide and silicon dioxide in the environment, may be used to treat local soils to make them permanently oleophillic. These soils can then be used to minimize, consolidate, and clean up oily spills. Because local soils are used and only minor amounts of chemicals are required, the cost of cleanup is drastically lowered while response time is much quicker.

18 Claims, 11 Drawing Sheets

5,288,177

METHODS OF TREATING LOCAL SOILS TO MAKE THEM OLEOPHILLIC AND OF USING THE SOILS TO MINIMIZE, CONSOLIDATE, AND CLEAN UP OILY SPILLS

This is a continuation of Ser. No. 07/700,769, filed May 15, 1991, now abandoned.

BACKGROUND OF THE INVENTION

1. Field of the invention

This invention relates in general to treating a local soil to make it oleophillic and using the treated soil to minimize, consolidate, and clean up an oily spill.

It relates in particular to using silicone-type materials at ambient temperatures and atmospheric pressure as treating agents for naturally-occurring, locally-available soils, carrying out the treatment in locally available, commercial mixing equipment, spreading these treated soils on or adjacent to the oily spill-or where an oily spill might occur in the future--with locally-available commercial spreading equipment, allowing the oil to adsorb onto these soils, and then removing the oil-contaminated particles with locally-available, commercial earth-moving equipment.

2. Description of related art

When the spill of an oily substance, such as crude oil, a refined petroleum product, or other water-immiscible material occurs, it is extremely important to remove the substance as soon as possible to alleviate any harmful effects said materials might have on the environment. Delays can:

a) cause the volatile portion of the spill to vaporize,
b) cause the spill to spread over vast distances,
c) kill wildlife,
d) contaminate beaches, waterways, groundwater, and other portions of the lithosphere.

When the volatile portion of the spill vaporizes, the air is contaminated and the higher-boiling portions of the substance are left. These high boilers are usually more difficult to remove from the environment.

When the spill spreads; more of the environment is damaged, mans ability to effectively clean up the spill is diminished, and the cost of cleanup rises dramatically.

When fish, mammals, or birds are contaminated by oily spills, they can be killed or their reproductive cycle can be disturbed. In the case of local endangered species, the entire species can be wiped out.

When beaches are contaminated, they are effectively rendered unfit for use by both man and wildlife. The same is true for waterways. In both cases, a valuable natural asset is lost for sometime, if not forever.

When other portions of the lithosphere, such as the ground, are contaminated, the oil can penetrate soil and seep into aquifers thereby contaminating groundwater supplies.

Almost any organic polymer which can be fabricated as a particle, particularly as a foamed-particle with a specific gravity less than one, and which has an oleophillic surface can effectively adsorb most oily pollutants.

Unfortunately, the majority of the soils which make up the earth's lithosphere are inorganic, oleophobic materials. They will not readily adsorb oily substances. However, they can be made oleophillic by treating them with chemicals.

Thus it is possible to use two types of particles to assist in containing an oily spill and cleaning it up, namely;

a) synthetic organic polymer particles
b) chemically treated indigenous soils

If synthetic organic polymer particles are used, they must be factory-produced ahead of time, transported in huge volumes to the site prior to the spill occurring, and stored in anticipation of a spill. After the spill has been contained, this huge volume of oil-contaminated particles must be disposed of in its entirety. Thus large costs are incurred which may or may not prove to have been necessary.

If naturally-occurring soils at or near the spill site are made oleophillic by chemically treating them, no action need be taken until a spill occurs; and after the spill has been cleaned up, the oil can be removed from the soil and the cleaned soil can be returned to the environment. This eliminates some very large costs. However, the chemicals must be carefully chosen in order to make certain that they:

a) are acceptable in the environment,
b) are efficacious in the application,
c) are nonhazardous to inventory and ship, and
d) have a low order of toxicity.

It has been well known for over 50 years that clean, washed, graded, naturally-occurring siliceous materials containing surface hydroxy groups, such as silica sand and kaolinite-containing clays can be treated with various methyl-containing silicone materials to make the particles highly oleophillic. Some of these treatments are only temporary while others are permanent. A number of manufacturing plants exist around the world where such production takes place.

It is also widely known and documented that:

a) methyl silicone chemicals degrade slowly in the environment to carbon dioxide and silica which are naturally-occurring materials,
b) methyl silicones have an extremely low order of toxicity to humans and wildlife,
c) the methyl silicone-treated soils have a long life in the environment.

When these three facts are combined, methyl silicone treatments quickly become the first material of choice to evaluate for minimizing, consolidating, and cleaning up oily spills in an effective and economical manner.

It is the object of this invention to show:

a) many of these same methyl silicone treatments may be carried out on many of the uncleaned, ungraded local soils present in the lithosphere,
b) soils treated with permanent methyl silicone treatments will adsorb large amounts of oily spills,
c) treatment techniques can be extremely simple and can be carried out in readily available commercial equipment,
d) the treated soils can be spread on or adjacent to the oily spill, or at a site where an oily spill could occur at sometime in the future, using readily available commercial equipment.
e) once the treated soils have adsorbed the oil, they can readily be separated from either water or the lithosphere with readily available commercial equipment and easily disposed of.

3. Prior art

Methyl silicone treatment of siliceous particles

The process of treating siliceous particles with methyl silicones is well known and the body of work has been summarized in several major textbooks, two of which are:

a) Silylated Surfaces, D. E. Leyden and W. T. Collins, Gordon and Breach Publishers Inc, New York, (1980), b) Silanes, Surfaces, and Interfaces, D. E. Leyden and W. T. Collins, Gordon and Breach Publishers Inc, New York, (1986)

The treatments discussed in this body of work fail to meet the objectives of this invention for one or more of the following reasons:

a) None of the work was performed on dirty, unwashed, ungraded locally-available soils.

b) None of the resulting particles was tested on or suggested for use in the environment for cleaning up oily spills.

c) None of the treatments was applied in readily-available, portable, commercial mixing equipment.

U.S. Pat. No. 3,843,306, Oct. 22, 1974, Whittington et al. In this patent, Whittington claims a manufactured foamed particle created from a blend of solid and liquid alkali metal silicates post treated with an oleophillic/hydrophobic agent used for the purpose of controlling oil pollution. The patent shows examples of using various silicone materials as the post treatment.

The foamed particle in this patent fails to meet the objectives of this invention because:

a) manufactured foamed particles created from a blend of solid and liquid alkali metal silicates are not naturally-occurring, locally-available soils.

b) foamed particles created from a blend of solid and liquid alkali metal silicates cannot be manufactured in readily-available, portable, commercial mixing equipment. The process requires special manufacturing equipment to heat, crush, and classify the particles.

A product called "Seabeads", produced by Pittsburg-Corning, is cited as a competitive material in U.S. Pat. No. 3,843,306. (Col 2, lines 5–22). Seabeads fail to meet the objectives of this invention because:

a) they are a manufactured product, not a locally-available, naturally-occurring particle.

b) they cannot be manufactured in readily-available, portable, commercial mixing equipment. The process requires special manufacturing equipment.

c) the beads are not post-treated with a silicone-based surface treatment to make them oleophillic A product called "silane-treated Cabo-O-Sil", produced by the Cabot Corporation is also cited as a competitive material in U.S. Pat. No. 3,843,306. Cab-O-Sil is characterized as a silane-treated silica. It fails to meet the objectives of this invention because:

a) it is a manufactured product produced by burning chlorosilanes and collecting the resulting ash, not a locally-available, naturally-occurring particle.

b) it cannot be manufactured in readily-available, portable, commercial mixing equipment. The process requires special manufacturing equipment.

Letter from Earth Sciences, Inc to US Geological Survey, Feb. 25, 1969, Douglas N. Stevens This letter discloses Earth Sciences, Inc work with sand and chlorosilanes to manufacture an oleophillic particle from methyl silicone materials and locally-available, naturally-occurring soils. This was an initial disclosure of an early version of the invention cited in this patent application.

The treatment disclosed in this letter fails to meet the objectives of this invention because the treatment is carried out using a gaseous mixture of dichlorodimethylsilane and chlorotrimethylsilane. These particular compounds vaporize at temperatures in excess of 150° F. As this temperature of vaporization is above normal ambient air temperature, the manufacturing process would have to include a step in which the chlorosilane mixture is heated to vaporize it. The invention cited in this application does not require this heating step.

It is also well-known that dichlorodimethylsilane and chlorotrimethylsilane hydrolyze readily at normal ambient temperatures in moist air releasing gaseous hydrogen chloride which can then further react with moisture to form hydrochloric acid. Thus, these materials are hazardous to ship and require a users to protect themselves against injury during particle treatment.

Article, California Oil World, Los Angeles, Calif., April 1969: This article, titled "Claim Oil Slick May Be Kept From Beaches", also discloses Earth Sciences, Inc work with sand and chlorosilanes to. manufacture an oleophillic particle from methyl silicone materials and locally-available, naturally-occurring soils. Again, this was an initial disclosure of an early version of the invention cited in this patent application.

The treatment disclosed in this article fails to meet the objectives of this invention because the treatment is carried out using the vapors of silicon compounds volatilized at 150° F. As this temperature of vaporization is above normal ambient air temperature, the manufacturing process would have to include a step in which the chlorosilane mixture is heated to vaporize it. The invention cited in this application does not require this heating step.

Article, Denver Post Wed. Mar. 19, 1969: This article, titled "Sand May Clean Up Oil" and written by Gene Linberg, also discloses Earth Sciences, Inc work with sand and chlorosilanes to manufacture an oleophillic particle from methyl silicone materials and locally-available, naturally-occurring soils. Again, this was an initial disclosure of an early version of the invention cited in this patent application.

The treatment disclosed in this article fails to meet the objectives of this invention because the chemical nature of the treatment is not specified.

SUMMARY OF THE INVENTION

Naturally-occurring, locally-available soils with siliceous surfaces can be rendered permanently oleophillic by treating the soils with one or more of the seven classes of treating agents listed below.

a) Organochlorosilanes having the general formula $R_nSiCl_{(4-n)}$ where n is equal to 1, 2, or 3 and R is equal to H or any hydrocarbon group such as methyl, ethyl, or octadecyl.

b) Organoalkoxysilanes having the general formula $R'_nSi(OR)_{(4-n)}$ where n is equal to 1, 2, or 3 and R and R' are equal to H or any hydrocarbon group such as methyl, ethyl, or octadecyl.

c) Organoacetoxysilanes having the general formula $R_nSi(OOCCH_3)_{(4-n)}$ where n is equal to 1, 2, or 3 and R is equal to any hydrocarbon group such as methyl, ethyl, or octadecyl.

d) Methylhydrogensiloxane polymers having the general formula $R_3SiO(CH_3SiHO)_nSiR_3$ where n is any value from 1 to 60 and R is equal to any hydrocarbon group such as methyl, ethyl, or octadecyl.

e) Polydimethylsiloxane polymers having the general formula $R_3SiO[(CH_3)_2SiO]_nSiR_3$ where n is any value from 0 to 500,000 and R is equal to any hydrocarbon or alkoxy group such as methyl, ethyl, or octadecyl, methoxy, or ethoxy.

f) Alkali salts of methyl silicates such as sodium methyl siliconate and sodium dimethyl siliconate.

g) Copolymers or mixtures of the above classes of materials such as mixed organochlorosilanes or dimethylmethylhydrogensiloxane copolymers.

Examples of naturally-occurring, locally-available soils which commonly contain siliceous surfaces and which can be considered for treatment are:

| | | |
|---|---|---|
| Adobe | Boulder clay | Dolomite |
| Alluvial soil | Chernozemic soil | Dust |
| Agril | China clay | Fuller's earth |
| Basalt | Clay | Gumbo, Gumbo soil |
| Bauxite | Clunch | Indurated clay |
| Bog soil | Desertic soil | Kaolin |
| Bole | Diatomacious earth | Kaolinite |
| Laterite | Mold | Regur soil |
| Latosolic soil | Podsolic soil | Residual clay |
| Limestone | Porcelain clay | Sand |
| Lithosol | Potter's clay | Sedimentary clay |
| Loam | Pumice | Silt |
| Loess | Quartzite | Talc |
| Marl | Red clay | Till |
| Mica | Regosol | Tundra soil |

Treatment can be carried out in any convenient open or closed mixer which has the ability to mix a solid particle with a liquid. The mixers commonly used by builders and contractors or found in sand, gravel, and ready-mix concrete manufacturing plants are excellent.

Additional examples of such mixers are seen in Section 19 of Perry's Chemical Engineer's Handbook titled, "Liquid-Solid Systems". Suitable mixers can also be found in Section 20 titled, "Solids-Drying and Gas-Solid Systems" and in Section 21 titled, "Solid-Solid and Liquid-liquid Systems". These sections of Perry's Chemical Engineers Handbook are incorporated here by reference.

The treatment consists of preparing the treating agents, adding the agents to the soil(s) as it agitates in the mixer, testing samples as the treatment goes forth, and dumping the treated materials when the samples show the materials are fully treated.

At this point the treatment is complete, and the treated materials are ready to use. The treated materials may be stored outdoors, although prolonged exposure to sunlight will gradually remove the treatment from the top layer. The balance of the materials will not be adversely affected.

In use, the treated soils, which are hydrophobic and tend to float, can be spread on the water, at the water's edge, on the shoreline of the body of water containing the spill, on any polluted surface' or on any unpolluted surface where future pollution might occur. They will adsorb the oil, and the oily soils will agglomerate into a relatively immobile mass which may then be removed easily from the water or the lithosphere with any convenient, manual-, mechanical-, hydraulic-, electric-, gas-, or pneumatic-powered equipment.

DETAILED DESCRIPTION OF THE INVENTION

1. General considerations

Figure 1:
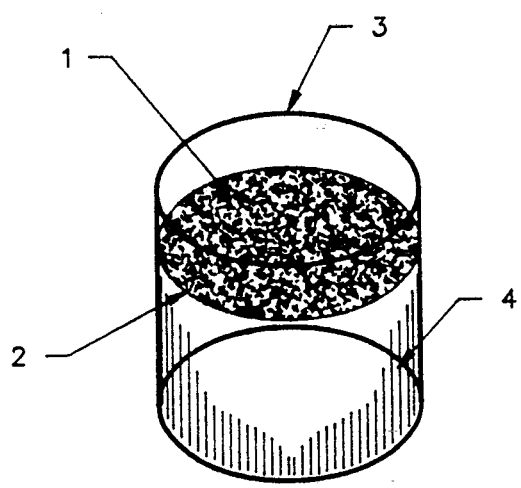
FIG. 1 shows properly hydrophobed sand.

In order to provide a surface treatment of siliceous particles which renders the particles effective in the collection of oil or other hydrocarbons from aqueous surfaces, beaches, or soils; it is necessary to bond the organosilicon material to the surface of the soil particles by covalent bonding.

Although siliceous particles are easily coated with fluids, such as polydimethylsiloxane fluid, such particles are ineffective in collecting oils, presumably because the fluid dissolves in the oil and renders the particle useless for this purpose. As a consequence, it is necessary to use reactive organosilicon monomers capable of forming covalent bonds to the siliceous substrate.

The organosilicon monomers must also bear one or more hydrocarbon radicals such as methyl, ethyl, propyl, butyl and continuing homologues up to and including octadecyl or one or more aromatic radicals such as phenyl, benzyl, or tolyl.

The global silicone industry currently manufactures mainly organosilane monomers which contain methyl as the hydrocarbon radical, so methyl-containing organosilane monomers are the least expensive and the most readily available. This makes them the material of choice for dealing with oil spills.

2. General methods of treatment

In early work, we treated sand particles with a gaseous mixture of chlorosilanes. This work was disclosed in a letter from Earth Sciences to the US Geological Survey on Feb. 25, 1969 and in an article printed in California Oil in April of 1969.

We subsequently found that mixed chlorosilanes can be applied to the particles as a liquid without first vaporizing them to a gaseous mixture. This eliminates a very costly treating step and makes it practical to apply the treatment under field conditions. Liquid methylchlorosilanes or mixtures thereof can be sprayed onto an agitated mass of siliceous material, such as sand, and will render the siliceous material permanently oleophillic.

When methylalkoxysilanes or methylacetoxysilanes are hydrolyzed in an aqueous media and the resulting solution is applied to siliceous particles, the silanols thus formed readily attach themselves to the surface of the particles. When the excess liquid is decanted, and the particles are allowed to air dry; they become permanently oleophillic.

Alternatively, the particles may be treated with an alkaline aqueous solution of alkali metal methylsilanolates such as those described by Noll in "Chemistry and Technology of Silicones" published by Academic Press, New York, N.Y., in 1968 on pages 605 and 606. When these alkaline aqueous solutions of alkali metal methylsilanolates are used to treat particles, they should be applied as a concentrated solution followed by neutralization with weak acids or carbon dioxide.

Methylsiloxane polymers bearing hydrogen atoms bonded to silicon can also be used to treat siliceous particles. When these polymers are used, the hydrogen atoms attached to silicon react with the OH groups bonded to the solid surface so as to form molecular hydrogen and a covalently-bonded methyl silicone surface on the particles.

Catalysts, such as iron, zinc, tin, lead or zirconium salts, can be added to methylhydrogensiloxane polymers to facilitate the reaction. The polymers can be applied without dilution, from solvent dispersions, or from aqueous emulsions and will make the surfaces of siliceous particles permanently oleophillic.

Additionally as previously mentioned, siliceous particles are easily coated by fluid polydimethylsiloxane polymers, but such loosely bonded films do not render the particles permanently oleophillic. Particles treated in this manner can be heated to 300° to 400° C. for 30 minutes to render them permanently oleophillic, but this is an impractical field treatment.

An alternative method of use would be to dissolve a polydimethylsiloxane polymer in concentrated sulfuric acid and apply the resulting mixture to the siliceous particles. This treatment renders the siliceous particles permanently oleophillic.

Sections 5. through 18. below show examples of successful treatments using the general methods outlined herein.

3. Screening test methods

Two screening tests were set up to determine whether the soil particles had been properly treated:
a) Test for hydrophobicity
b) Test for permanent oleophilicity Test for hydrolphobicity: The test for hydrophobicity is only carried out when the density of the material is greater than that of water. Properly hydrophobed soils will be supported on the surface of the water by the surface tension of the water.

The test consists of placing a small amount of material on the surface of a container of clean water and observing the action which takes place. If the soil is properly hydrophobed, water will not wet it, and the soil will float. If the soil is not properly hydrophobed, it is wet by the water and sinks.

FIG. 1 shows what the results of this test look like when the material is properly hydrophobed. Treated sand (1) is floating on the surface (2) of a beaker (3) of clean water (4).

Figure 2:
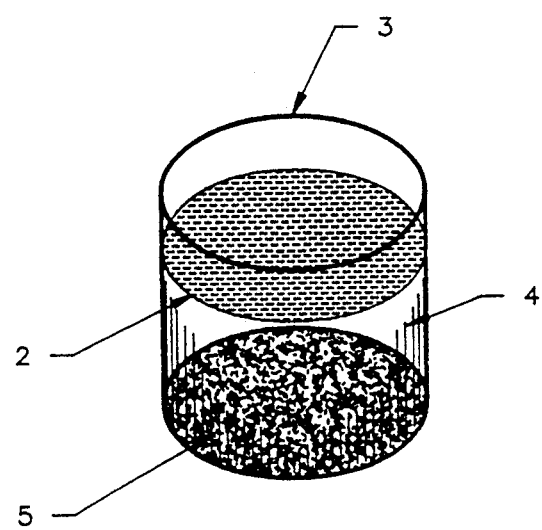
FIG. 2 shows untreated or improperly treated sand.

FIG. 2 shows the results when the soil is not properly hydrophobed. Untreated or poorly treated sand (5) sinks to the bottom of the water-filled beaker (3).

Test for Oleophillicity: The oleophillicity test is carried out on all treated soils regardless of their density. Soils which are rendered permanently oleophillic will attract oil, the oil will be adsorbed on the surface of the soil particles, and the oily particles will cling together.

The test is carried out by placing the treated soil on the surface of clean water and adding a few drops of oil. If the soil is permanently oleophillic, the soil particles move to the oil, the soil adsorbs the oil, and the oily particles become relatively immobile and cling together. If the density of the soil is greater than the density of water, then when additional soil is added to the oily soil, the oily mass sinks below the surface of the water.

If the soil is not permanently oleophillic, the treatment on the surface of the soil particles will dissolve in the oil, and the soil particles will sink to the bottom of the water-filled container.

FIG. 1 shows the properly treated sand (1) floating on the surface (2) of a beaker (3) filled with clean water (4).

Figure 3:
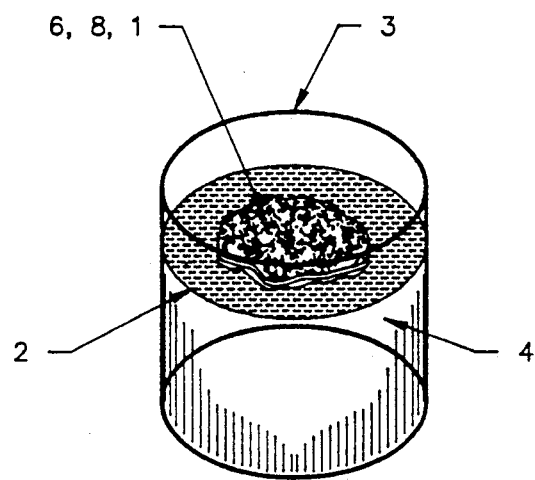
FIG. 3 shows that properly-treated oleophillic sand adsorbs and agglomerates oil.

In FIG. 3, oil (6) has been added. The oil (6) has adsorbed onto the surface of the treated sand particles (1), and the oily sand has agglomerated into a relatively immobile mass on the surface of the water (8).

Figure 4:
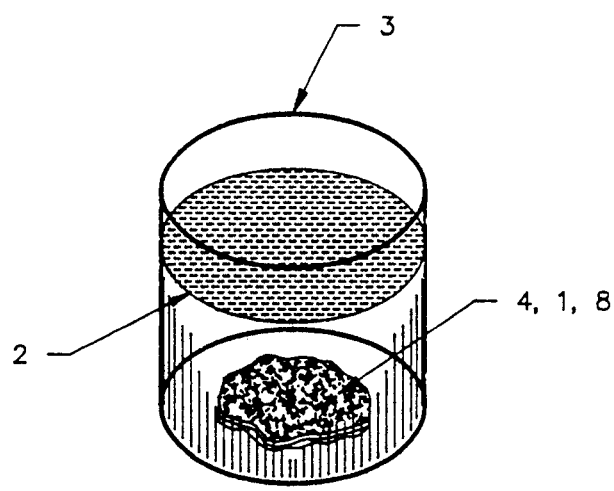
FIG. 4 shows how the agglomerated oily sand sinks when more treated sand is added.

In FIG. 4, more treated sand (1) has been added, and the oily particles (8) have sunk below the surface of the water (2) due to the weight of the additional sand.

Figure 5:
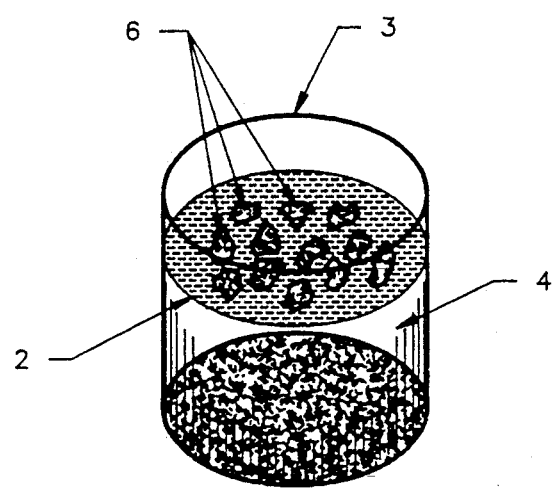
FIG. 5 shows how untreated sand sinks leaving the oil behind on the surface of the water.

In FIG. 5, untreated or poorly treated sand (5) has sunk to the bottom, while the oil (6) remains on the surface of the clean water.

4. Treating Apparatus

Figure 6:
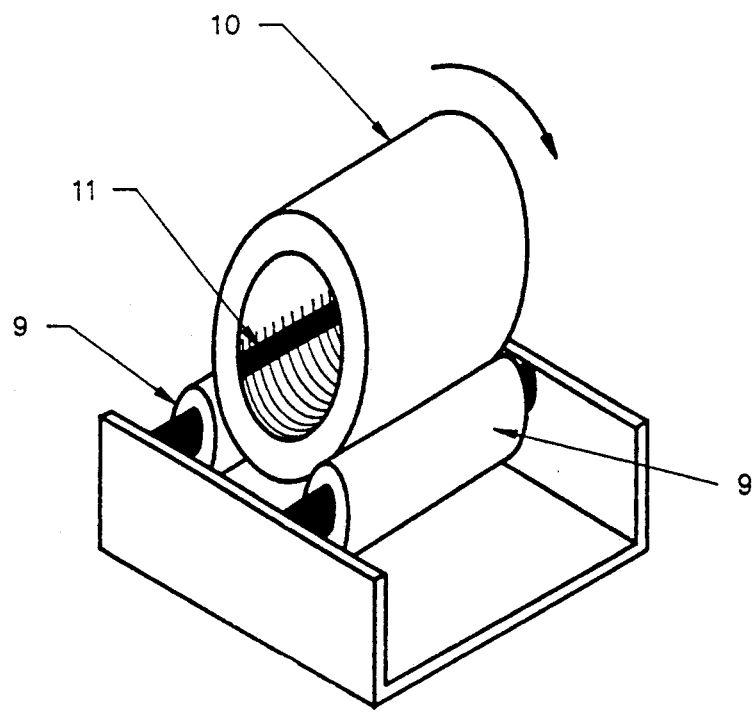
FIG. 6 shows a laboratory mixer.

FIG. 6 shows a simple rotating laboratory mixer made from a set of rollers (9) and a one gallon paint can (10). Two wooden baffles (11) approximately one inch high are fastened to the sides of the paint can to enhance the mixing action imparted by the rollers. When the mixer is started up, the can rotates at 37 RPM on its cylinderical axis.

5. Mixed Organochlorosilane Treatment of Mason's Sand

A small amount of an untreated mason's sand was tested for hydrophobicity. It readily sank, thus failing the test.

One pint of the untreated masons sand was placed in a one gallon plastic bucket. One milliliter of a 50/50-by volume mixture of dimethyldichlorosilane and trimethylchlorosilane was added to the sand using a small atomizing hand sprayer. A lid was placed on the pail, and the pail was shaken vigorously by hand for several minutes. The cover was then removed, a second milliliter of the mixed chlorosilanes cited above was added, the lid was replaced, and the bucket was again shaken vigorously by hand for several minutes.

The lid was removed and the sand was tested for hydrophobicity. It failed the test.

A third milliliter of mixed chlorosilanes was added in drops, the cover was replaced, and the bucket was shaken again for several minutes.

After a 30 minute wait, the sand was again tested for hydrophobicity. It easily floated on water showing it was well a treated and had become hydrophobic.

The treated sand was then tested for oleophillicity by dropping motor oil on the sand. The oil wicked into the sand and when additional treated sand was added, the agglomeration of the oily sand sank below the water's surface showing that the sand was permanently oleophillic.

6. Mixed Organochlorosilane Treatment of Forest Sand

A sample of local sand was obtained from the forest floor in Midland County, Mich., the trash was removed by passing the sand through a coarse screen, and the sample was allowed to air-dry by leaving it at room temperature overnight.

A small amount of the untreated forest sand was tested for hydrophobicity. It readily sank, thus failing the test.

One cup of the sand was treated with 4 milliliters of a 50/50-by volume mixture of dimethyldichlorosilane and methyltrichlorosilane. The treatment was carried out by placing the sample of the forest sand in the mixer shown in FIG. 7, turning the mixer on, adding the silane, and mixing the sand and silane together for 10 minutes.

Following the treatment, the sand was tested for a hydrophobicity and oleophillicity in the same manner as the masons sand in example one. The tests showed the sand was both hydrophobic and permanently oleophillic.

7. Mixed Organochlorosilane Treatment of Silica Sand

A sample of silica sand was obtained from a local supplier, and one pint of the sand was treated with 2.5 milliliters of a 50/50-by volume mixture of dimethyldichlorosilane and methyltrichlorosilane. The treatment was carried out by placing the sample of the silica sand in the mixer shown in FIG. 7, turning the mixer on, adding the silane, and mixing the sand and silane together for 10 minutes.

Following the treatment, the silica sand was tested for hydrophobicity and oleophillicity in the same manner as the mason's sand in example one. The tests showed the silica sand was both hydrophobic and permanently oleophillic.

8. Dimethyldichlorosilane Treatment of Forest Sand

One pint of the forest sand was treated with 7.5 milliliters of dimethyldichlorosilane. The treatment was carried out in a series of steps.

First, the sample of the forest sand was placed in the mixer shown in FIG. 6. The mixer was turned on. One and one-half milliliters of dimethyldichlorosilane was added, and the sand and silane were mixed together for 5 minutes.

Second, the mixer was opened, another 1½ milliliters of dimethyldichlorosilane was added, and the sand and the silane were mixed together for another 5 minutes. This second step was repeated until a total of 7.5 milliliters of dimethyldichlorosilane had been added and mixed into the sand.

Each time the second step was repeated, the operator sniffed the air for a whiff of chlorosilane odor. No odor was detected until after 7.5 millilaters of silane had been added. Then a strong odor of chlorosilane remained which indicated that the available treatment sites of the sand had been saturated.

Following the treatment, the forest sand was tested for hydrophobicity and oleophillicity in the same manner as the masons sand in example one. The tests showed the forest sand was both hydrophobic and permanently oleophillic.

9. Mixed Chlorosilane Treatment of Forest Sand

One pint of the sand was treated with 4 milliliters of a 75/25-by volume mixture of dimethyldichlorosilane and methyltrichlorosilane. The treatment was carried out in a series of steps.

First, the sample of the forest sand was placed in the mixer shown in FIG. 6. The mixer was turned on. One milliliter of mixed chlorosilane was added, and the sand and silane were mixed together for 5 minutes.

Second, the mixer was opened, another 1 milliliter of mixed chlorosilane was added, and the sand and the silane were mixed together for another 5 minutes. This second step was repeated until a total of 4 milliliters of mixed chlorosilane had been added and mixed into the sand.

Each time the second step was repeated, the operator sniffed the air for a whiff of chlorosilane odor. No odor was detected until after 4 millilaters of silane had been added. Then a strong odor of chlorosilane remained which indicated that the available treatment sites of the sand had been saturated.

Following the treatment, the forest sand was tested for hydrophobicity and oleophillicity in the same manner as the mason's sand in example one. The tests showed the forest sand was both hydrophobic and permanently oleophillic.

10. Mixed Chlorosilane Treatment of Diatomaceous Earth

One cup of a Johns Manville Celite ®, a diatomaceous earth, was treated with 2 milliliters of a 50/50-by volume mixture of dimethyldichlorosilane and methyltrichlorosilane. The treatment was carried out in a series of four steps.

First, the sample of the diatomaceous earth was placed in the mixer shown in FIG. 6. The mixer was turned on. One-half milliliter of mixed chlorosilane was added, and the diatomaceous earth and silane were mixed together for 10 minutes.

Second, the mixer was opened, another ½ milliliter of mixed chlorosilane was added, and the earth and the silane were mixed together for another 10 minutes. This second step was repeated until a total of 2 milliliters of mixed chlorosilane had been added and mixed into the earth.

Each time the second step was repeated, the operator sniffed the air for a whiff of chlorosilane odor. No odor was detected until after 2 milliliters of silane had been added. Then a strong odor of chlorosilane remained which indicated that the available treatment sites of the earth had been saturated. Some agglomeration of the material particles was also noted.

The treated earth was left exposed to the air to allow the excess chlorosilanes to escape. The material was then tested for hydrophobicity and oleophillicity in the same manner as the mason's sand in example one. The tests showed the diatomaceous earth was both hydrophobic and permanently oleophillic.

11. Mixed Chlorosilane Treatment of Calcined Clay

One cup of ground clay made by Oil-Dri Corporation of America, a montmorillite clay, was treated with 2 milliliters of a 50/50-by volume mixture of dimethyldichlorosilane and methyltrichlorosilane. The treatment was carried out in a series of four steps.

First, the sample of the clay was placed in the mixer shown in FIG. 6. The mixer was turned on. One-half milliliter of mixed chlorosilane was added, and the clay and the silane were mixed together for 10 minutes.

Second, another ½ milliliter of mixed chlorosilane was added, and the clay and the silane were mixed together for another 10 minutes. This second step was repeated until a total of 2 milliliters of mixed chlorosilane had been added and mixed into the clay.

The treated clay was left exposed to the air to allow the excess chlorosilanes to escape. The material was then tested for hydrophobicity and oleophillicity in the same manner as the mason's sand in example one. The tests showed the clay was both hydrophobic and permanently oleophillic.

12. Scaleup—Forest Sand Treatment

Seventy pounds of air-dried forest sand was placed in a small portable cement mixer; and while rotating the mixer, 3 ounces of dimethyldichlorosilane were added to the sand using a small plastic spray bottle.

Following the treatment, the forest sand was tested for hydrophobicity and oleophillicity in the same manner as the mason's sand in example one. The tests showed the forest sand was both hydrophobic and permanently oleophillic.

Additionally, the sand was shoveled, mounded, raked, handled, bagged and moved around with various hand tools. The treated sand had the same appearance and handling properties as untreated sand.

13. Alkoxysilane Treatment of Forest Sand

Two-thirds of a pint of water was acidified by adding a few milliliters of white vinegar. Four milliliters of dimethyldimethoxysilane were then added and the mixture was shaken. After a few minutes, the mixture became a clear solution indicating hydrolysis of the methoxy group to form dimethylsilane diol and possibly some of its homologus oligomers.

This solution was then added to a slurry of one pint of Michigan forest sand in one-half pint of water. The slurry was mixed for 30 minutes in the treating device shown in FIG. 7. The water was then decanted, and the sand was air dried.

Following the treatment, the forest sand was tested for hydrophobicity and oleophillicity in the same manner as the mason's sand in example one. The tests showed the forest sand was both hydrophobic and permanently oleophillic.

14. Methylhydrogen/dimethylsiloxane Copolymer Treatment of Forest Sand

Six fluid ounces of dry forest sand was treated with one milliliter of a 30/70 methylhydrogen/dimethylsiloxane copolymer end-blocked with trimethylsilyl groups to limit its viscosity to 30 to 40 centistokes. The commercial name of this polymer is Masil XL-1 Crosslinker. It is manufactured by PPG-Mazer Chemical Company.

The material was treated by placing the sand in the mixer shown in FIG. 6, adding the silicone polymer, and mixing for several hours.

Following the treatment, the forest sand was tested for hydrophobicity and oleophillicity in the same manner as the mason's sand in example one. The tests showed the forest sand was both hydrophobic and permanently oleophillic.

15. Sodium Methyl Siliconate Treatment of Forest Sand

One milliliter of methyltrimethoxysilane and two milliliters of polydimethylsiloxane were dissolved in 8 milliliters of concentrated sodium hydroxide solution to form a solution of sodium methyl siliconate and sodium dimethylsiliconate. When the solution was complete, it was diluted with water to 100 milliliters and added to 250 milliliters of forest sand. The mass was vigorously agitated in a fruit Jar for several minutes and then air dried.

Following the treatment, the forest sand was tested for hydrophobicity and oleophillicity in the same manner as the mason's sand in example one. The tests showed the forest sand was both hydrophobic and permanently oleophillic.

16. Polymethylhydrogensiloxane Treatment of Mason's Sand

One cup of the mason's sand was treated with 1 milliliter of polymethylhydrogensiloxane fluid This fluid was end-blocked with trimethylsilyl groups to limit its viscosity.

The sample of the mason's sand was placed in the mixer shown in FIG. 6. The mixer was turned on. One millilater of polymethylhydrogensiloxane was added, and the sand and siloxane were mixed together for 20 minutes.

Following the treatment, the mason's sand was tested for hydrophobicity in the same manner as the mason's sand in example one. The tests showed the mason's sand was not hydrophobic.

17. Polymethylhydrogensiloxane Treatment of Forest Sand

One cup of the forest sand was treated with 1 milliliter of polymethylhydrogensiloxane fluid This fluid was end-blocked with trimethylsily groups to limit its viscosity.

The sample of the forest sand was placed in the mixer shown in FIG. 6. The mixer was turned on. One milliliter of polymethylhydrogensiloxane was added, and the sand and siloxane were mixed together for 20 minutes. On opening up the mixer, it appeared the polymethylhydrogensiloxane material had stayed in the same spot in which it was placed initially rather than dispersing throughout the sand.

The mixer was closed, and another milliliter of polymethylhydrogensiloxane was added in several small increments. The material was then mixed for another 20 minutes.

Following the treatment, the forest sand was tested for hydrophobicity and oleophillicity in the same manner as the mason's sand in example one. The tests showed the forest sand was both hydrophobic and permanently oleophillic.

18. Polymethylhydrogensiloxane/gasoline Treatment of Forest Sand

One cup of the forest sand was treated with 1 milliliter of polymethylhydrogensiloxane fluid diluted with 9 milliliters of gasoline. This fluid was end-blocked with trimethylsilyl groups to limit its viscosity.

The sample of the forest sand was placed in the mixer shown in FIG. 6. The mixer was turned on. The ten milliliters of the polymethylhydrogensiloxane/gasoline were added, and the sand and diluted siloxane were mixed together for 20 minutes.

Following the treatment, the gasoline was allowed to evaporate and the forest sand was tested for hydrophobicity and oleophillicity in the same manner as the mason's sand in example one. The tests showed the forest sand was both hydrophobic and permanently oleophillic.

It was concluded from the tests carried out in sections 16., 17., and 18. that methylsiloxane polymers bearing hydrogen atoms bonded to silicon can be used to treat siliceous particles. When these polymers are used, the hydrogen atoms attached to silicon react with the OH groups bonded to the solid surface so as to form molecular hydrogen and a covalently-bonded methyl silicone surface on the particles.

This reaction proceeds readily if the particles contain organic material. Michigan forest sand was observed to react without any additional catalytic material being added. In fact, it reacted before it was dispersed throughout the mass of particles, giving uneven treatment. Dilution of the polymer to ten times its volume with gasoline before adding it to the treating vessel produced a mass of well treated particles.

Mason's sand, previously washed, was found to be unreactive when treated with a hydrogen-bearing polymer. However a catalyst can be added to provide the required reactivity.

19. Beach Protection Testing

Figure 7:
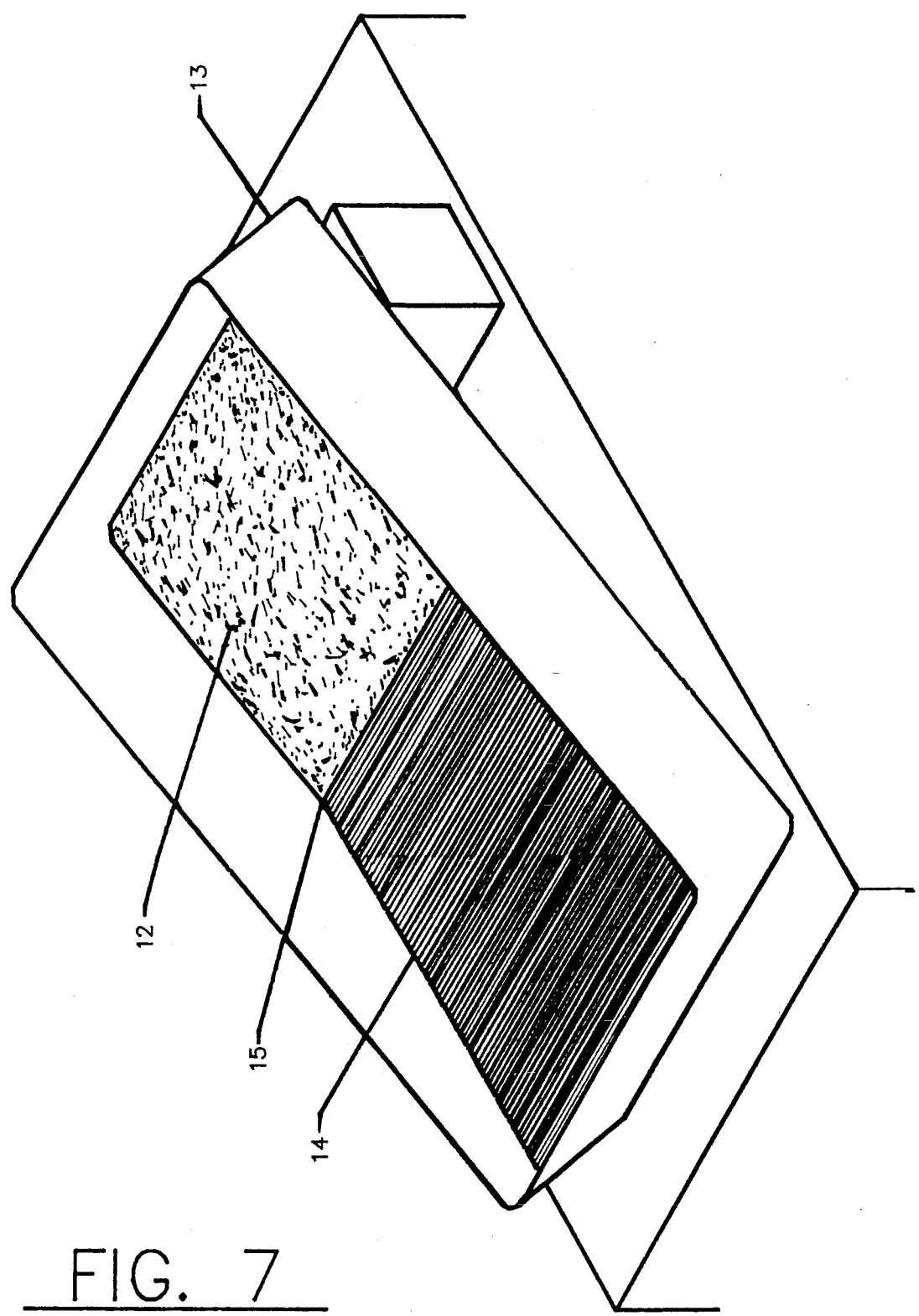
FIG. 7 shows a simulated beach.

FIG. 7 shows a simulated beach. In order to simulate this beach at the water's edge, untreated white silica sand (12) was placed on a sloping aluminum pan (13) to create a model of a beach. Water (14) was placed into the pan so a water/sand interface was created (15).

Figure 8:
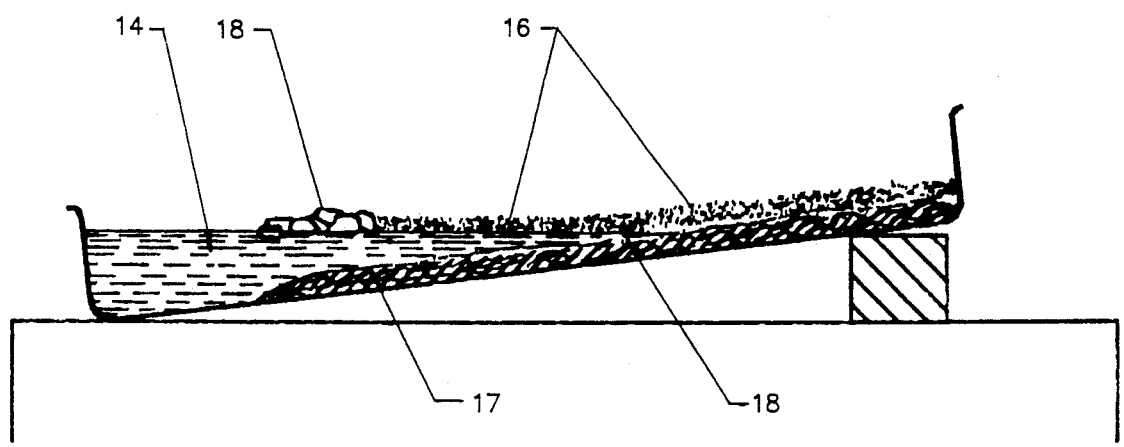
FIG. 8 shows a cross-section of the simulated beach

FIG. 8 is a cross section of FIG. 7 which shows how treated forest sand (16) from the scale-up treatment described in section 9. was spread over the water/sand interface (15) so than some of the treated sand was laying on the beach and some was floating on the water. Crude oil (18) was then placed on the water at the edge of the water and the sand (17).

Figure 9:
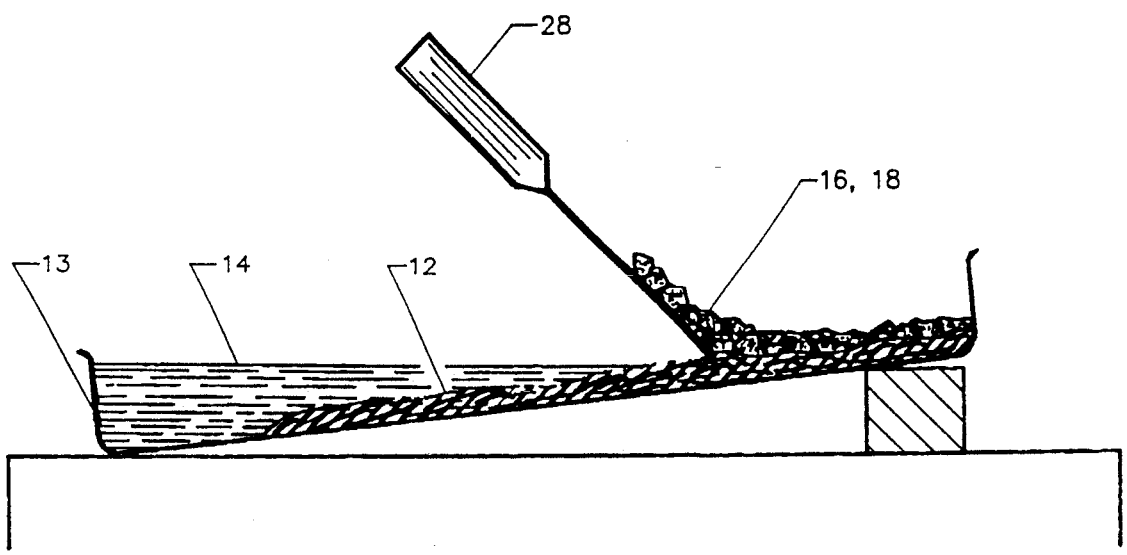
FIG. 9 shows the contaminated sand being removed with a spatula

The crude oil (18) rapidly wicked into the forest sand (16). The oil-contaminated forest sand (16) was then easily removed from the silica sand (12) and from the water with a spatula as shown in FIG. 9.

20. More Beach Protection Testing

Figure 10:
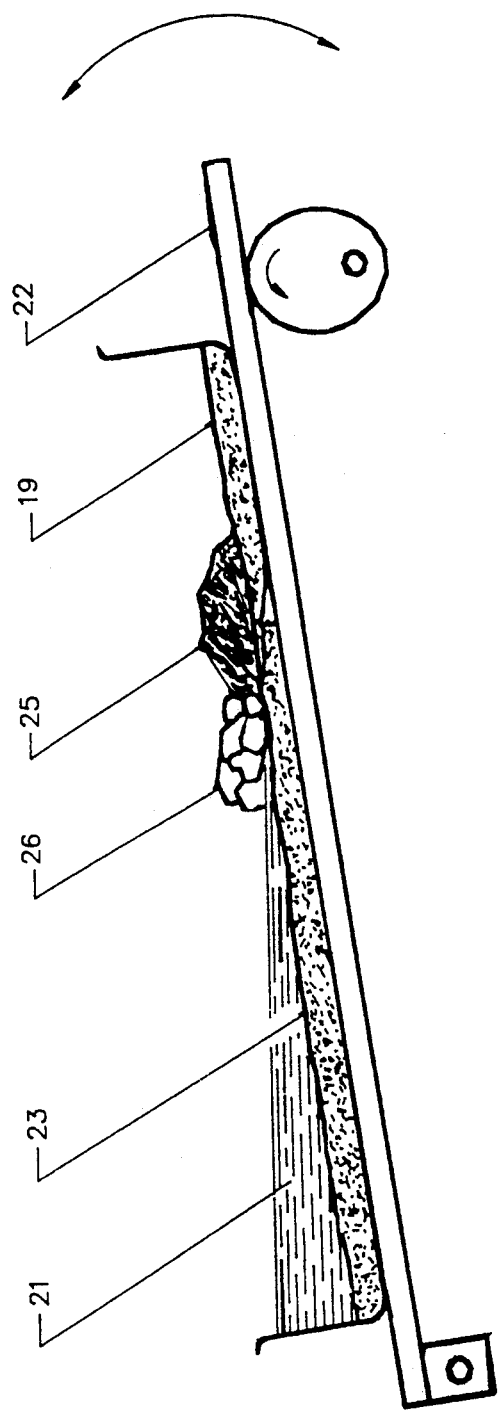
FIG. 10 shows a cross-section of a simulated beach on a rocker table.
Figure 11:
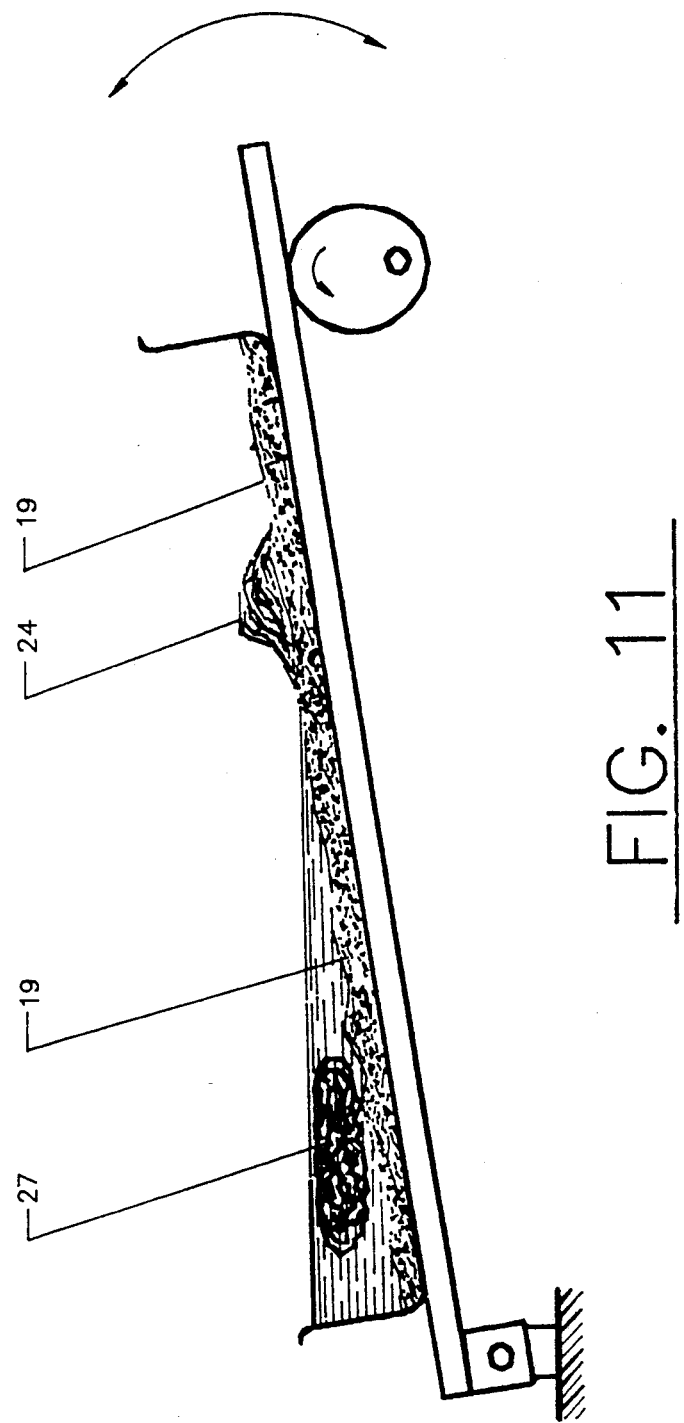
FIG. 11 shows how the treated sand protects the beach

In another test, shown in FIGS. 10 and 11, a miniature beach was simulated by placing a layer of untreated sand (19) in a 2 ft by 3 ft shallow flat pan. Water (21) was added to immerse the sand. The pan was then tilted and placed on a rocker-table (22) to simulate wave action. A "beach" (23) was formed on the low end of the pan where water-wet sand accumulated.

About 300 grams of a silane-treated sand (24) was added to the beach below the strand line (25). Approximately 10 cubic centimeters of Wyoming crude oil (26) was poured onto the water surface near the beach.

As the oil (26) encroached on the beach, it picked up the treated sand (24) and created an interface that prevented additional oil from climbing onto the beach. As wave action was increased, the oil engulfed this barrier and reacted with the additional treated sand.

Within one-half hour, the treated sand had agglomerated all of the oil, and the oil-treated sand product localized and accumulated just "off-shore" (27).

The original water-wet sand (19) and the dry sand (19) that was higher on the beach were never stained by the oil. It was quite easy to physically remove the agglomerated product with a stiff piece of paper.

21. Surface oil removal test

Several goldfish were placed into a glass bowl which held two gallons of water. Untreated sand was placed on the bottom of the bowl. Ten cubic centimeters of crude oil was poured on the surface of the water and subsequently spread over the entire surface.

Silane-treated sand was then sprinkled over the surface of the oil lying on the water. The oil wicked into the sand and agglomerated. A slight excess of sand was added to increase the density of the oil/sand mixture.

The bowl was jarred, and the agglomerated sand/oil mixture sunk to the bottom of the jar leaving an oil-free surface. A small amount of the sand which had not come into contact with the oil also remained on the surface.

This same experiment was repeated at least six times over a period of two weeks. The same results were observed. The fish were not effected and continued to eat normally.

In the third week, the sunken oil/sand agglomerate was removed and examined. The oil seemed to have lost its slimy character, and the mixture could be handled without staining the hand.

When placed back in water, the agglomerated sand released a white buoyant substance that clouded the water when agitated. It then settled out leaving clear water. A second set of experiments run in the absence of fish produced the same results. Since the material could not be found in the original sand, it was assumed to be a product of changes that took place in the oil.

22. Oil Pour Test of Treated Midland Forest Sand

A cup of the sand treated in example 12. was placed on an aluminum foil surface and approximately three to five ounces of motor oil was poured onto the sand in random fashion.

The motor oil wicked into the sand. After a few minutes, the oil-contaminated sand was easily lifted off the foil. A clean surface was left behind. It was obvious that had the test been carried out on a large scale, the contaminated sand could have easily been removed with a hand shovel or a front end loader.

23. Butane Torch Burning Test of Michigan Forest Sand

Oil was poured on a sample of the treated sand, and a butane torch was held close to the sand. The oil caught on fire. When the torch was removed, the fire went out. This was repeated several times. Eventually, the temperature of the sand was raised to the point where the oil continued to burn after the torch was removed.

The sand was examined after all the oil was burned away. Other than being darkened, the sand did not appear to be changed in any manner.

The results of this test show that oil recovered onto the sand may be easily disposed of by properly incinerating it.

24. Sweeping Compound Test of Treated Michigan Forest Sand

THree to 4 ounces of motor oil was poured across a carpet, a concrete floor, and a paper towel. Approximately one cup of treated sand was then sprinkled onto the oil. The oil wicked into the treated sand from all three surfaces. After a few minutes, the oily sand was swept off the carpet, the concrete floor, and the paper towel. All the free oil was removed, although a stain was left in the small cracks of the concrete and on the other two surfaces.

25. Oil Spill at Sea Test with Sand Blasting Outfit

Treated sand was dispersed with a modified sand blaster over a thick film of oil which was floating on the Pacific Ocean. The sand adsorbed much of the thick oil consolidating it and allowing it to be removed easily.

However, when the treated sand was dispersed over a thin slick of oil, it was of little use in fully removing the slick. The larger particles became coated with oil and sank while the fine particles became coated with oil and agglomerated together on the surface of the water.

The researchers concluded that the treated sand would be most effective on the thick layers of oil found in the immediate vicinity of a large oil spill.

26. Percolation Test on Water-saturated Sand

Oil was percolated upwards through a water-saturated bed of treated sand. The water saturation did not impair the adsorption of the oil onto the sand particles.

Following the percolation test, oil was poured over a water-saturated bed of sand. Again, the water saturation did not impair the adsorption of the oil by the sand particles.

The researchers concluded that water-saturated sand would adsorb oil as readily as dry sand.

Although the above description of the chemical treatments of naturally-occurring soils, the methods of treating, and the methods of testing the treatment contain many specificities; these should not be construed as linmiting the scope of the invention but merely as providing illustrations of some of the preferred embodiments of this invention. The scope of the invention should be determined by the appended claims and their legal equivalents, rather than the examples given.

We claim:

1. An improved method of treating locally-available siliceous particles with silicon chemicals to render the particles permanently oleophillic wherein the improvement comprises the steps of:
   a) choosing a particle taken from the group of particles consisting of sand, gravel, stone, limestone, diatomacious earth, and clay;
   b) loading the particles to an agitating mixer taken from the group of mixers consisting of solid-solid, solid-liquid, solid-gas, and liquid-liquid mixers;
   c) adding a silicon chemical taken from the group of organochlorosilanes, organoalkoxysilanes, organoacetoxysilanes, methylhydrogensiloxane polymers, and polydimethylsiloxane polymers;
   d) mixing said particles and said silicon chemical together until said silicon chemical is covalently bonded to said particles;

whereby said particles are rendered permanently oleophillic.

2. The invention of claim 1 wherein said particle chosen is sand and said chemical treatment is an organochlorosilane.

3. The invention of claim 1 wherein said particle chosen is sand and said chemical treatment is an organoalkoxysilane.

4. The invention of claim 1 wherein said particle chosen is sand and said chemical treatment is an organoacetoxysilane.

5. The invention of claim 1 wherein said particle chosen is sand and said chemical treatment is a polydimethylsiloxane fluid dissolved in sulphuric acid.

6. The invention of claim 1 wherein said particle chosen is sand and said chemical treatment is a polymethylhydrogensiloxane copolymer.

7. The invention of claim 1 wherein said particle chosen is diatomacious earth and said chemical treatment is an organochlorosilane.

8. The invention of claim 1 wherein said particle chosen is limestone and said chemical treatment is an organochlorosilane.

9. The invention of claim 1 wherein said particle chosen is diatomacious earth and said chemical treatment is an organoalkoxysilane.

10. The invention of claim 1 wherein said particle chosen is diatomacious earth and said chemical treatment is an organoacetoxysilane.

11. The invention of claim 1 wherein said particle chosen is diatomacious earth and said chemical treatment is a polydimethylsiloxane fluid dissolved in sulphuric acid.

12. The invention of claim 1 wherein said particle chosen is diatomacious earth and said chemical treatment is a polymethylhydrogensiloxane copolymer.

13. The invention of claim 1 wherein said particle chosen is clay and said chemical treatment is an organochlorosilane.

14. The invention of claim 1 wherein said particle chosen is clay and said chemical treatment is an organoalkoxysilane.

15. The invention of claim 1 wherein said particle chosen is clay and said chemical treatment is an organoacetoxysilane.

16. The invention of claim 1 wherein said particle chosen is clay and said chemical treatment is a polydimethylsiloxane fluid dissolved in sulphuric acid.

17. The invention of claim 1 wherein said particle chosen is clay and said chemical treatment is a polymethylhydrogensiloxane copolymer.

18. An improved method of treating siliceous particles with silicon chemicals to render the particles permanently oleophillic wherein the improvement comprises the steps of:
   a) choosing a particle taken from the group of particles consisting of adobe, alluvial soil, agril, basalt, bauxite, bog soil, bole, boulder clay, chernozemic soil, china clay, clay, clunch, desertic soil, diatomacious earth, dolomite, dust, fuller's earth, gravel, gumbo, gumbo soil, indurated clay, kaolin, kaolinite, laterite, latosolic soil, limestone, lithosol, loam, loess, marl, mica, mold, podsolic soil, porcelain clay, potter's clay, pumice, quartzite, red clay, regosol, regur soil, residual clay, sand, sedimentary clay, stone, silt, talc, till, and tundra soil;
   b) loading the particles to an agitating mixer taken from the group of mixers consisting of solid-solid, solid-liquid, solid-gas, and liquid-liquid mixers;
   c) adding a silicon chemical taken from the group of organochlorosilanes, organoalkoxysilanes, organoacetoxysilanes, methylhydrogensiloxane polymers, and polydimethylsiloxane polymers;
   d) mixing said particles and said silicon chemical together until said silicon chemical is covalently bonded to said particles;

whereby said particles are rendered permanently oleophillic.

* * * * *